G. E. PETERSON.

AUTOMATIC BACK REST.

APPLICATION FILED FEB. 17, 1917.

Reissued May 8, 1917.

14,299.

INVENTOR

Gustaf E. Peterson

By S. Jay Teller

ATTORNEY

THE NORRIS PETERS CO., PHOTO-LITHO., WASHINGTON, D. C.

UNITED STATES PATENT OFFICE.

GUSTAF E. PETERSON, OF HARTFORD, CONNECTICUT, ASSIGNOR TO PRATT & WHITNEY COMPANY, OF HARTFORD, CONNECTICUT, A CORPORATION OF NEW JERSEY.

AUTOMATIC BACK-REST.

14,299. Specification of Reissued Letters Patent. Reissued May 8, 1917.

Original No. 1,191,220, dated July 18, 1916, Serial No. 91,312, filed April 15, 1916. Application for reissue filed February 17, 1917. Serial No. 149,362.

*To all whom it may concern:*

Be it known that I, GUSTAF E. PETERSON, a citizen of the United States, residing at Hartford, in the county of Hartford and State of Connecticut, have invented a new and useful Improvement in Automatic Back-Rests, of which the following is a specification.

This invention relates to those devices that are used for supporting or reinforcing stock while being turned in a lathe or ground in a grinding machine, which devices are known as back-rests.

The object of the invention is to provide a back-rest applicable to the common types of lathe, grinder or similar machine tool, which can be quickly set for stock of any diameter within the range of the implement and that will automatically adjust itself to the stock and firmly support it as the size becomes reduced by turning or grinding.

The embodiment of the invention illustrated has a body with radially arranged plungers which are adjustable in length in order to adapt the device to be used with the stock of various diameters, and that are normally thrust outward by springs and when in use are forced inward toward a common center by cams controlled by a weighted lever so that the plungers will automatically follow the stock as it is being reduced in diameter, and their inner ends always bear against the surface of the stock with a uniform pressure sufficiently strong to prevent it from bending or yielding under the action of the cutting or abrading tool.

Figure 1:
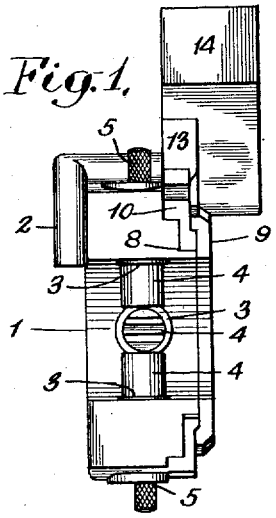
Figure 2:
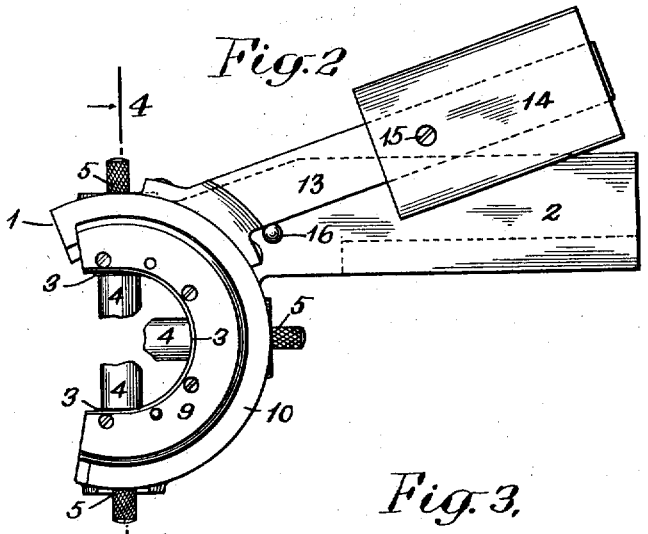
Figure 3:
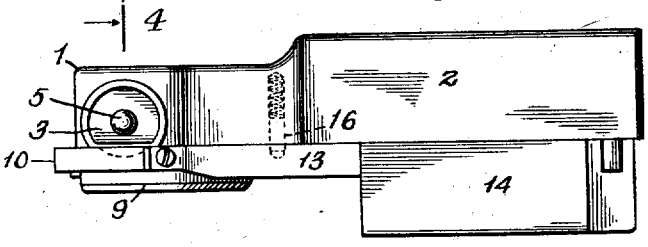
Figure 4:
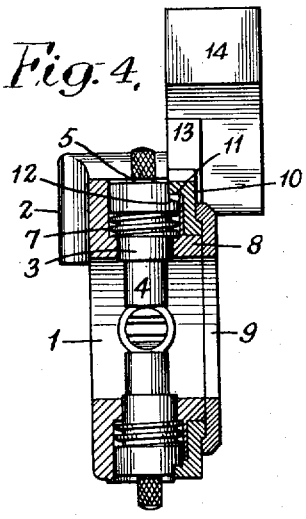
Figure 6:
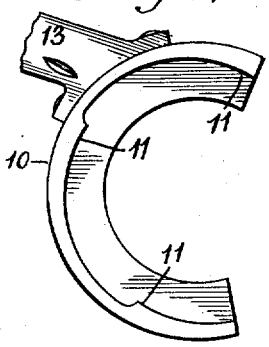
Figure 5:
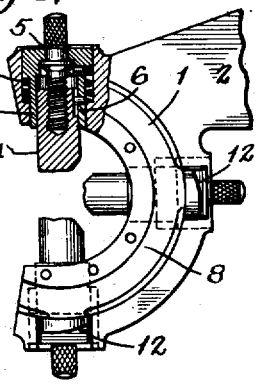

Of the accompanying drawings Figure 1 is a view looking toward the front edge of the back-rest. Fig. 2 shows a side view of the same. Fig. 3 shows a top view. Fig. 4 shows a section on the plane indicated by the dotted line 4—4 on Fig. 2. Fig. 5 is a side view with the plunger-operating cam-plate omitted and one end of the body cut in section. Fig. 6 shows a view of the inside of the cam-plate.

In the form of the invention shown the yoke-shaped body 1 has a shank 2 by means of which the implement may be mounted on the bed of the machine tool with which it is to be used. In three radially formed sockets, one at the top, one at the bottom, and one at the back of the body, are plungers, each of which consists of a retaining sleeve 3 and a backing stud 4, the stud being adjustably held in the sleeve by a screw 5. By turning this screw the stud may be projected more or less from, or withdrawn more or less into the sleeve. A pin 6 holds the sleeve and stud against relative rotary movement. Springs 7 are arranged in the sockets to thrust the plungers radially outward.

Turning around on a segmental rib or hub 8 projecting from one side face of the body and retained in place by a cap plate 9 is an arc-shaped cam-plate 10. On the inner side of a wall on the inside face of this cam-plate are three cams or wedges 11. These cams are designed to overlie the shoulders 12 on one side of the outer ends of the plunger sleeves. When the cam-plate is turned one way the cams engage the shoulders on the sleeves and force the plungers uniformly inward, and when the cam-plate is turned the other way the plungers are pressed outwardly by their springs. The cams hold the plungers from rotating and from being thrust out of the sockets by the springs, and the shoulders against which the cams bear are somewhat inclined or wedge-shaped so that there will be an easy engagement between the shoulders and the cams. Attached to the cam-plate is an arm or lever 13 movably held upon which is a weight 14. When the screw 15 is loosened the weight may be moved along the cam-plate lever. This weight tends to turn the cam-plate so as to force the plungers radially inward toward a common center. A spring pin 16 is arranged to project a slight distance from the shank of the body beneath the lever so as to hold the weight up when the implement is not being used.

After the piece of stock to be operated is located in the heads of the machine, the back-rest is moved up into position in the common way and the screws are turned so that the ends of the plunger studs will bear upon the top, bottom and back of the stock. As the stock is turned or ground, or otherwise reduced in diameter, the plungers under the influence of the weight continue to bear upon the stock and support or reinforce it from three sides against the pressure or thrust of the operating tool; thus no matter how much the stock is cut down it is always firmly supported by this back-rest.

A back-rest embodying the invention is particularly well adapted for use in connection with a grinding machine. As will be obvious from an inspection of the drawing, one side of the back-rest is entirely open so as to permit a grinding wheel to have unobstructed access to stock held by the plungers. By making one side of the back-rest open, as shown and described, and by providing for the automatic uniform inward movement of the plunngers as the diameter of the stock is reduced, I am able to provide for the continual support of the stock at points close to the wheel and in the same transverse planes therewith.

Preferably, as indicated in Fig. 6 of the drawing, the cam surfaces 11 are very slightly inclined, the result being that as the cam-plate 10 is moved a strong inward pressure is exerted. It is impossible, however, for any outward pressure on the plungers to cause them to move outward as the cam surfaces 11 lock the plungers against any such movement.

It will be observed that by my invention I have provided a back-rest the parts of which are automatically movable inward to accommodate themselves to the surface of the stock as the diameter is reduced, but which can not be moved inward so far as to deflect the stock toward the wheel. Ordinarily, the action of the wheel will be primarily resisted by the lower plunger which engages the stock at the bottom and by the horizontal plunger which engages the stock at the side opposite the wheel. These two plungers are automatically movable inward in unison by means of the weight 14 and the cams 11, and if no limiting means were provided, the weight 14 would have to be very carefully regulated both as to size and position in order to prevent the transmission to the plungers of pressure so great as to deflect the stock upward and toward the wheel. I provide a limiting means which positively prevents any such deflection of the stock without, however, preventing the firm and rigid support of the stock at all times by the bottom and side plungers. The limiting means provided consists of the third plunger at the top, which may be and preferably is similar in construction and mounting to the other plungers. It will be clear from the foregoing description and from the drawing, that the bottom and side plungers can move inward only to the same extent that the top plunger moves inward. The top plunger, however, engages the stock as do the others, and can therefore move inward only as the diameter of the stock is reduced. This top plunger, therefore, serves in coöperation with the other plungers to prevent any deflection of the stock under the action of the weight 14. Any tendency of the weight to move the bottom and side plungers in too far tends to move the top plunger inward to the same extent, and obviously both the top and bottom plungers can not be moved inward except as the diameter of the stock is reduced.

The invention claimed is;

1. A back-rest having a yoke-shaped body, radially arranged plungers loosely supported by the body, means for varying the length of the plungers, springs for thrusting the plungers outward, and a weight for moving the plungers inward.

2. A back-rest having a yoke-shaped body, radially extensible plungers loosely supported by the body, means for increasing or diminishing the length of the plungers, springs for thrusting the plungers outwardly, a cam-plate for forcing the plungers inwardly, and a weight mounted on and adapted to turn the cam-plate.

3. A back-rest having a yoke-shaped body, radially arranged plungers loosely supported by the body, means for adjusting the inner ends of the plungers independently of the body part of the plungers, springs for thrusting the plungers outwardly, a cam-plate for forcing the plungers inwardly, and a weight for turning the cam-plate and moving the plungers radially inward.

4. A back-rest having a body, radially arranged extensible plungers loosely supported by the body, means for increasing or diminishing the length of the plungers, springs for thrusting the plungers outward, and a weight for moving the plungers inward.

5. A back-rest having a yoke-shaped body, radially arranged sleeves loosely supported by the body, studs loosely carried by the sleeves, means for adjusting the studs longitudinally with relation to the sleeves, means for thrusting the sleeves outwardly, and a weight for moving the sleeves and studs inwardly.

6. A back-rest having a yoke-shaped body with radially arranged sockets, sleeves loosely mounted in said sockets, studs loosely mounted in said sleeves, adjusting screws connecting the sleeves and the studs, springs arranged in the sockets for thrusting the sleeves and studs outward, a cam-plate with cams engaging the outer ends of the sleeves, and a weight adapted to turn the cam-plate and force the sleeves and studs inward.

7. A back-rest having a yoke-shaped body, radially arranged plungers loosely supported by the body, means for varying the length of the plungers, means for thrusting the plungers outward, and means for moving the plungers inward.

8. In a back-rest adapted to support stock while being acted upon by a grinding wheel, the combination of a body, a plunger, mechanism for automatically moving the plunger inward as the diameter of the stock is reduced, and means dependent on the diameter of the stock for limiting the action of the said mechanism.

9. In a back-rest adapted to support stock while being acted upon by a grinding wheel, the combination of a body, a plunger, mechanism for automatically moving the plunger inward as the diameter of the stock is reduced and for automatically locking it against outward movement, and means dependent on the diameter of the stock for limiting the first said action of the said mechanism.

10. In a back-rest adapted to support stock while being acted upon by a grinding wheel, the combination of a body, two plungers positioned to respectively engage the stock at the bottom and at the side opposite the wheel, mechanism for automatically moving the plungers inward as the diameter of the stock is reduced, and means for engaging the stock at the top to limit the extent of inward movement of the plungers.

11. The combination in an open-sided back-rest, of a body and radial plungers constructed and arranged to permit stock held thereby to be engaged by a grinding wheel, and mechanism having positive engagement with all of the plungers and automatically tending to move them inward uniformly.

12. The combination in an open-sided back-rest, of a body and radial plungers constructed and arranged to permit stock held thereby to be engaged by a grinding wheel, two of the plungers being substantially diametrically opposite each other, and mechanism having positive engagement with all of the plungers and automatically tending to move them inward uniformly.

13. The combination in an open-sided back-rest, of a body and radial plungers constructed and arranged to permit stock held thereby to be engaged by a grinding wheel, and mechanism automatically tending to move the plungers inward and automatically locking them against movement outward.

In testimony whereof, I hereto affix my signature.

GUSTAF E. PETERSON.

Copies of this patent may be obtained for five cents each, by addressing the "Commissioner of Patents, Washington, D. C."